June 25, 1935.  H. J. PARDEE  2,005,845
METER CONSTRUCTION
Original Filed Feb. 10, 1931

Inventor
Howard J. Pardee
A. Ponack
By
Attorney

Patented June 25, 1935

2,005,845

UNITED STATES PATENT OFFICE 2,005,845

METER CONSTRUCTION

Howard J. Pardee, New York, N. Y.

Original application February 10, 1931, Serial No. 514,884. Divided and this application June 2, 1933, Serial No. 674,102

9 Claims. (Cl. 73—167)

The present application is a division of a prior application for patent, Serial No. 514,884, filed on February 10, 1931, for Gas control unit. The latter application discloses a gas control device, particularly adapted to maintain and control a flow or feed of gas, such as chlorine or ammonia and the like, from a source of supply to a body of water, sewage or like material to be treated. The said device includes, among other features, a compact and efficient arrangement of gas compensator, meter, back pressure valve and gauge in a single portable unit.

This invention relates particularly to a novel and improved meter construction especially adapted for use in connection with the aforementioned unit for the purpose of determining the rate of flow therethrough. In its broadest aspect, however, the aforesaid meter construction is capable of adaptation to other apparatus involving flow of gas, the rate of which needs to be measured to set the feed or flow and to check its maintenance.

In the detailed disclosure of the invention as hereinafter set forth, two preferred embodiments of the invention are described. However, it is to be understood that these are primarily illustrative in character and the invention is not intended to be limited thereto. Each of the exemplary constructions comprises essentially an inner meter member whereby the gas passing through the apparatus is introduced into the meter, an outer meter member whereby the gas leaves the meter to return to the apparatus, and means for indicating the feed or rate of flow of the gas through the apparatus. The constructions described also include various other details, some of which are common to both forms and others of which are peculiar to one or the other of the constructions, said several details being fully explained in the following specification, from which the several objects and advantages of the present invention will be clearly apparent to those skilled in the art to which it pertains.

On the accompanying sheet of drawings.

Similar reference characters designate corresponding parts throughout the several figures of drawing.

Figure 1:
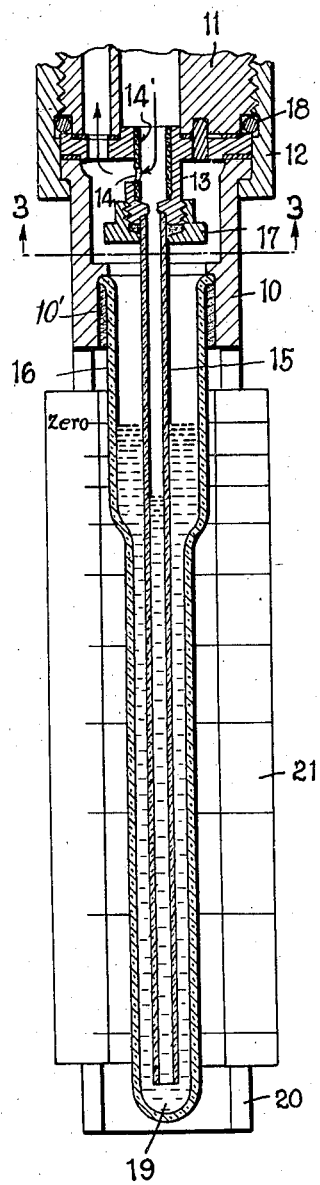
Fig. 1 is a sectional representation of one embodiment of meter, a portion of the adjacent coacting apparatus being also shown.

The meter illustrated in Fig. 1 of the drawing is of the orifice type. It comprises a meter case 10, which is securely suspended from the adjacent portion 11 (back plate or other member) through the medium of the meter connection nut 12 which, as shown, is threaded onto member 11. Gas-tight relationship is assured by the use of gaskets. The meter also includes an orifice assembly 13, the orifice preferably being an opening 14 in the wall of the assembly. The latter may be provided with a glass lining 14', in which case opening 14 also extends through this member.

Inner glass tube 15 of the meter unit is supported from the orifice assembly 13, and telescopes into the outer glass tube 16, which in turn is mounted in suitable conventional manner, as by cement 10' or the like, in meter case 10. The cement or the like 10' is of course disposed between the upper end of the outer tube and the adjacent wall of the casing 10. As illustrated in Fig. 1, the upper part of outer tube 16 is preferably of greater diameter than the lower part. Inner tube 15 is securely held to the orifice assembly by the large square packing nut 17. As shown, glass lining 14' is, in effect, an extension of inner tube 15.

As clearly shown on the drawing, the orifice assembly may comprise a horizontal flange member and a substantially cylindrical wall projecting downwardly from said flange member into case 10. Orifice 14 extends laterally through this cylindrical wall. The aforesaid flange member is supported on a flange provided at the upper end of case 10. The lower end of nut 12 is provided, as illustrated, with an inwardly directed flange which engages under the lower surface of the meter case flange.

As a result of the aforedescribed construction, the entire meter may be unscrewed as a unitary whole from the rest of the apparatus by unscrewing the meter connection nut 12. To disassemble the meter, as when it is to be cleaned, split ring 18, which prevents dislodgement of nut 12 from the rest of the meter, is snapped out, whereupon nut 12 may be slipped down over the meter case 10. The manometer liquid 19 may, of course, be poured out. The orifice holder 13, with inner tube 15 attached thereto, may then be withdrawn.

One of the defects of orifice meters of the usual type is that the pressure on the inlet and discharge of the orifice is transmitted to the manometer through either tubes or long ports. With such an arrangement, there is often considerable trouble with the meter due to plugging of these ports. In the construction of Fig. 1, however, the orifice is disposed in the downwardly projecting, substantially cylindrical wall of assembly 13, that is, adjacent the upper end of the inner and outer passageways defined by the inner and outer tubes 15 and 16, thus eliminating all ports and connections which may become plugged. If, as shown, the said wall is provided with a lining 14', the orifice 14 will, of course, also extend through such lining.

Another defect of prior constructions is that both the inner and outer tubes are severally attached directly to the adjacent portion of the coacting apparatus. With such an arrangement, it is difficult to remove the outer tube without breaking off the long light inner tube which is held more or less rigidly to the apparatus. In the present construction, however, inner tube 15 is held in a separate member 13 which is removable from the apparatus with the outer tube 16 and is indirectly connected to this outer tube by means of the split ring 18. The inner tube, can then be removed, as above described, without breaking, by removing the split ring, slipping down the meter nut, and withdrawing the light orifice assembly and inner tube.

Figure 3:
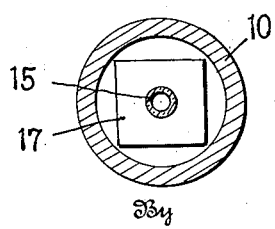
Fig. 3 is a view taken on line 3—3 of Fig. 1.

As shown in Fig. 3, packing nut 17 is square, and the corners of this square nut come into close contact with the interior of meter case 10 so that when the orifice assembly 13 is raised, it cannot be moved sideways until after this nut is above the end of case 10. This relationship of parts makes it impossible to tilt the orifice assembly 13 and tube 15 to such an extent as to induce breaking of the latter during the time that the assembly 13 is being loosened from case 10. It may often happen that the holder 13 becomes stuck to case 10 and a knife blade or the like has to be inserted therebetween to separate them. This involves a tilting or tipping which might result in the breaking of inner tube 15, but which the packing nut 17 prevents.

In operation, the gas flows in at the top of the inner tube 15, that is, at the inlet to assembly 13, out through the orifice 14, which in effect constitutes the outlet from assembly 13, and up and out of the meter, as indicated by the arrows in Fig. 1. That is, the flow of gas makes a sharp, substantially right angular turn just before passing through the orifice. However, heavy particles which would tend to plug the orifice tend to be carried by their velocity momentum on by and down into the inner tube instead of making the turn with the gas. In this manner, the small orifice is maintained free of fouling.

To push the gas through the orifice 14, the pressure in the inner tube 15 is greater than that in outer tube 16. This greater pressure in the inner tube not only forces the gas through the orifice but also depresses the liquid 19 in the inner tube to a level below the level of the liquid in the outer tube, substantially as illustrated in Fig. 1. The more gas flowing through orifice 14, the greater is the difference in pressure and the farther the inner liquid level is depressed below the outer liquid level. By measuring the depression, the amount of gas flowing through the apparatus can be determined.

To the latter end, the lower end of the case 10 has a portion thereof cut away leaving a particylindrical guard member 20 which substantially, but not entirely encompasses the outer tube 16. A suitable and properly calibrated meter scale 21 is movably mounted on guard member 20 by any suitable and conventional means (not shown). This scale 21 functions to indicate the amount of gas flowing through the apparatus by measuring the difference in liquid levels. In making the measurement, the scale is slid up or down in the guard member until the zero line thereof is even with the liquid level in outer tube 16. The scale reading opposite the liquid level in inner tube 15 will then indicate the quantity of gas flowing through the orifice.

The advantage of the small cross section of the lower part of the outer tube 16 and the large cross section of the upper part thereof is that this arrangement allows less manometer liquid to be used. This is important where the gas being measured is soluble in the liquid, as is often the case. As the gas dissolves in the liquid 19, the liquid volume increases, raising the liquid level in the meter. If the outer tube 16 is large all the way down, the amount of increase in volume due to the solution of gas may change the level of the surface several inches, but if most of the length of the tube is of reduced cross section and only the upper part thereof enlarged, the change in the surface level due to dissolved gas will not be appreciable or of disturbing extent.

Figure 2:
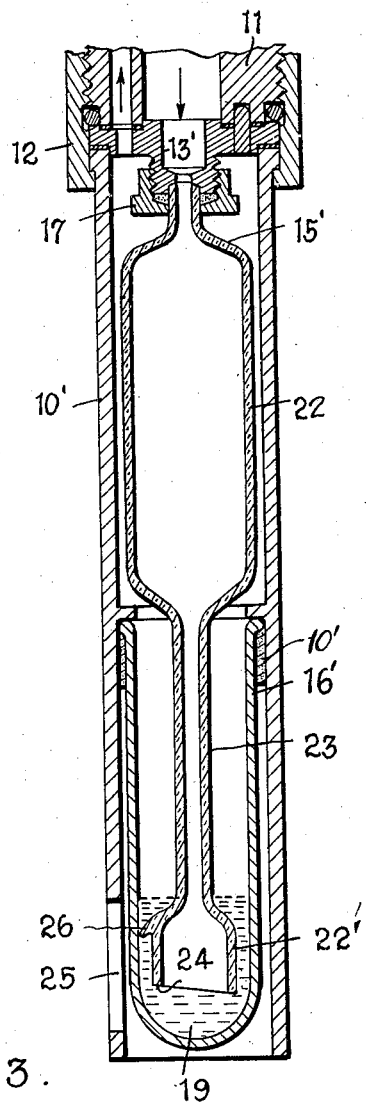
Fig. 2 is a view similar to Fig. 1, showing a second form of meter.

Fig. 2 illustrates an alternative form of meter. The purpose of this meter is, like that of the aforedescribed orifice meter, to indicate the quantity of gas flowing through the apparatus with which it is associated. The essential difference between the two meter constructions is that the latter is a bubbling meter, indicating the rate of flow by the rate of passage of bubbles therethrough instead of by the difference in level between two columns of liquid, as in the case of the first form.

The construction of the upper end of the bubbling meter is substantially identical with that of the orifice meter (Fig. 1). However, holder 13' is not provided with a lateral orifice 14, the sole outlet therefrom leading to the inner tube 15'. The latter includes, in addition to the uppermost reduced end which cooperates with the packing of nut 17 as in the case of the construction of Fig. 1, enlarged upper and lower portions 22 and 22' connected by a constricted intermediate portion 23. A bubbling lip 24 is provided at the lowermost end of the inner tube 15'.

As in the previous construction, the inner tube extends into outer tube 16' which resembles tube 16 except that it is of reduced length and of substantially uniform diameter throughout. Outer tube 16' is substantially entirely encompassed by meter case 10', in the lower portion of which it is suitably secured, as by cementing.

Meter case 10' is provided with a peep opening or window 25, and the parts should be so disposed that the little glass teat 26 on tube 15' is visible through the said window. Teat 26 is disposed above the high edge of bubbling lip 24, so that the aforesaid arrangement insures that this high edge is disposed directly in front of window 25.

In operation, the gas flows down through the inner tube 15', bubbles from the lip 24 of the bell 22', rises through the meter liquid 19, and passes from the top of the outer tube back to its destination. The rate at which gas is passing through the meter is indicated by the number of bubbles coming away from the bottom of the inner tube per unit of time. The quantity of gas passing for any rate of bubbling may be ascertained from calibration tables.

The space between the enlarged portion 22 and the adjacent inner surface of meter case

10' is sufficiently large to permit unimpeded passage of gas. However, it is also small enough to entrap and prevent passage of any liquid which may be entrained by the gas, and to return such liquid to the bottom of the outer tube. A minimum of manometer liquid is used, the level thereof being only sufficiently above the lower bell 22' to enable the bubbles to be easily seen.

While two preferred embodiments of the invention have been described somewhat in detail, it is to be understood that various minor changes may be made therein without departing from the spirit of the invention, the scope of which is intended to be limited only by the terms of the claims hereunto appended.

What is claimed is:

1. A gas flow measuring meter of the manometer liquid type particularly adapted for use in connection with a gas control unit or the like, said meter comprising an orifice assembly including an orifice, an inner tube depending from said assembly, an outer tube disposed in telescoping relation to the lower end of the inner tube, said outer tube being partly filled with manometer liquid, said assembly comprising a substantially tubular wall constituting an extension of said inner tube in substantial alinement with the latter, said orifice being arranged in said wall, means for attaching said assembly and tubes as a unit to said gas control unit or the like, and means for indicating the rate of flow of gas through the meter.

2. A gas flow measuring meter comprising a meter casing, a flange extending laterally from the upper end of said casing, a holder seated on said flange and including a portion projecting into said casing, an inner tube securely held by said holder and depending therefrom into said casing, said portion and said inner tube being in substantial alinement with each other, an outer tube securely mounted in said casing and disposed in telescoping relation to the lower end of said inner tube, said holder being provided with a gas inlet and a gas outlet, means for connecting said meter casing, holder and tubes as a unit to gas control apparatus or the like, said means comprising a lateral flange constituting a seat for said first-mentioned flange, and means for indicating the rate of flow of gas through said holder.

3. A gas flow meter comprising inner and outer telescopingly arranged substantially tubular meter members provided with juxtaposed lateral flanges, means for connecting said meter as a unit to coacting apparatus and for simultaneously maintaining said flanges in gastight contact with each other, said means comprising a meter connection nut and a split ring mounted in said nut and adapted to retain the latter in operative engagement with the flanges.

4. A gas flow measuring meter of the character described comprising essentially a substantially cylindrical meter casing, a threaded extension on said casing for attaching it in gastight depending relationship to gas control apparatus or the like with which the meter is intended to coact, an inner substantially tubular meter member whereby gas, the rate of flow of which is to be measured, is introduced into the meter, an outer meter tube arranged in telescoping arrangement with the lower end of said inner member, said casing substantially encompassing said inner member and outer tube, the upper end of said casing constituting, in effect, a continuation of said outer tube, means for connecting said outer tube to said casing, means for connecting said inner member to said casing, said last-named means comprising a flanged holder, the flange of which is seated on the top of said casing, said inner member being provided with an opening interconnecting the interior thereof with the interior of the outer tube, and means for indicating the rate of flow of gas through said meter.

5. A gas flow measuring meter of the character described comprising essentially an inner substantially tubular multi-part meter member whereby gas, the rate of flow of which is to be measured, is introduced into the meter, said inner meter member being provided with a restricted orifice-defining opening, an outer substantially tubular multi-part meter member whereby the said gas leaves the meter, and means for indicating the rate of flow of gas through the meter, said meter being attachable and detachable as a unit from the apparatus with which it is intended to coact, said inner member comprising an open-ended tube and a holder therefor, said outer member comprising a meter casing and an outer tube securely mounted in said casing, said inner tubular member extending substantially into said outer tube, and said opening extending also through said holder.

6. A flow measuring meter for use with gas control apparatus and the like, comprising a meter casing and telescoping inner and outer tubes, means connecting said outer tube to said casing, and additional means for connecting said inner tube to said casing, said additional means comprising a polygonal packing nut encompassing said inner tube and including portions extending into close adjacence to said meter casing.

7. A flow measuring meter for use with gas control apparatus or the like and comprising a meter casing and telescoping inner and outer tubes, a holder for said inner tube removably mounted on said casing, and guide means on said holder adjacent said inner tube, said means including portions extending into close adjacence to the opposed surfaces of said casing, whereby cocking of the holder and breakage of the inner tube during withdrawal thereof from the casing is prevented.

8. A flow measuring meter comprising a casing and telescoping inner and outer tubes, means for mounting said outer tube in said casing, and additional means for connecting said inner tube to said casing, said tubes and casing defining gas inlet and outlet passageways therebetween, and said additional means including an orifice constituting a passageway between the aforesaid passageways, said orifice extending laterally through said additional means and said inner tube.

9. A gas flow measuring meter comprising an open-ended multi-part glass inner tube and an outer tube, closed at its lower end and disposed in telescoping relation to the lower end of said inner tube, the uppermost part of said inner tube being exteriorly reinforced and provided with an orifice extending laterally therethrough.

HOWARD J. PARDEE.